(12) United States Patent
Watkins et al.

(10) Patent No.: US 9,395,940 B1
(45) Date of Patent: Jul. 19, 2016

(54) MODIFYING A DEVICE DRIVER OF A DEVICE TO INCLUDE A NETWORK CONFIGURATION OF THE DEVICE

(75) Inventors: David Watkins, Eagle, ID (US); Lyman Leonard Hall, Meridian, ID (US); Scott Rowberry, Meridian, ID (US); Kevin Thompson, Meridian, ID (US); Mark Montierth, Meridian, ID (US)

(73) Assignee: Marvell International Ltd., Hamilton (BM)

( * ) Notice: Subject to any disclaimer, the term of this patent is extended or adjusted under 35 U.S.C. 154(b) by 2188 days.

(21) Appl. No.: 12/436,017

(22) Filed: May 5, 2009

Related U.S. Application Data

(60) Provisional application No. 61/055,313, filed on May 22, 2008, provisional application No. 61/075,181, filed on Jun. 24, 2008.

(51) Int. Cl.
*G06F 9/44* (2006.01)
*G06F 3/12* (2006.01)

(52) U.S. Cl.
CPC ............ *G06F 3/1225* (2013.01); *G06F 9/4411* (2013.01)

(58) Field of Classification Search
None
See application file for complete search history.

(56) References Cited

U.S. PATENT DOCUMENTS

| | | | | |
|---|---|---|---|---|
| 5,630,076 | A * | 5/1997 | Saulpaugh et al. | 710/104 |
| 7,353,373 | B2 * | 4/2008 | Olbricht | 713/1 |
| 2002/0171865 | A1 * | 11/2002 | Parry | 358/1.15 |
| 2003/0048473 | A1 * | 3/2003 | Rosen | 358/1.15 |
| 2007/0086054 | A1 * | 4/2007 | Ikeno | 358/1.16 |

* cited by examiner

*Primary Examiner* — Ming Hon

(57) ABSTRACT

Some of the embodiments of the present disclosure provide method comprising receiving a request at a device for a device driver associated with the device, the request for the device driver being received at the device through a network, the device having a network configuration in the network; and transmitting the device driver from the device in response to the request, including transmitting the network configuration of the device.

10 Claims, 4 Drawing Sheets

MODIFYING A DEVICE DRIVER OF A DEVICE TO INCLUDE A NETWORK CONFIGURATION OF THE DEVICE

CROSS REFERENCE TO RELATED APPLICATIONS

The present application claims priority to U.S. Patent Application No. 61/055,313 filed May 22, 2008, entitled "Inclusion of Printer Network Address in Downloaded File," and also to U.S. Patent Application No. 61/075,181 filed Jun. 24, 2008, entitled "Using USB to improve the User Experience in Installing a Network Printer with Easy Install," the entire specifications of which are hereby incorporated by reference their entirety for all purposes, except for those sections, if any, that are inconsistent with this specification.

TECHNICAL FIELD

Embodiments of the present invention relate to network configuration of devices, and more particularly, inclusion of network configuration of devices in downloaded files.

BACKGROUND

Figure 1:
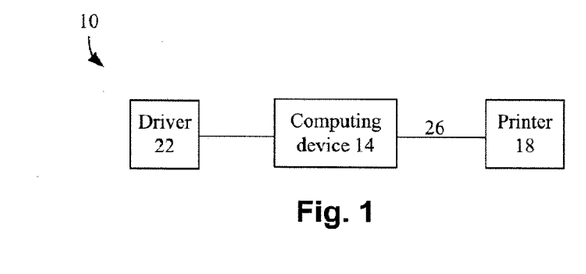
FIG. 1 illustrates an exemplary computing system that includes a computing device and a printer.

FIG. 1 illustrates an exemplary computing system 10 that includes a computing device 14 and a printer 18. The computing device 14 may be, for example, a desktop computer, a laptop, a server, and the like, and may operate with an appropriate type of operating system, e.g., Microsoft Windows®, MAC®, Linux®, etc. The printer 18 may be a color printer, a monochrome printer, a multifunction printer that includes additional capabilities like scanning, faxing, copying, and the like. The printer 18 is coupled to the computing device 14 through an appropriate link 26, e.g., a USB link, a wired or wireless network connection (e.g., a home or corporate network, intranet, internet, etc.), a serial port connection, a parallel port connection, and the like.

To fully utilize the functionalities of the printer 18, an appropriate print driver (e.g., print driver 22) typically needs to be loaded, installed, and configured in the computing device 14, as is well known in the art. In various embodiments, the print driver 22 may be available in an appropriate external storage device, e.g., a CD ROM, a flash drive, etc. Alternatively, the computing device 14 may also access the print driver 22 from a print server, or over a network (e.g., using the internet or an intranet, from a website of the manufacturer or seller of the printer 18, etc.).

While print drivers are often accessible to users of computing devices through resources mentioned above, in some cases, however, a user of a computing device may not have access to a print driver through such resources and/or may not be sure about which print driver to install on the computing device. For example, many different printer drivers for different types of printers typically are available for installation on a computing device, and selection of an appropriate (or correct) print driver from among a plurality of print drivers may be a difficult task.

SUMMARY

In various embodiments, the present disclosure provides a method comprising receiving a request at a device for a device driver associated with the device, the request for the device driver being received at the device through a network, the device having a network configuration in the network, and transmitting the device driver from the device in response to the request, including transmitting the network configuration of the device.

In various embodiments, the present disclosure provides an apparatus comprising a storage unit configured to store a device driver associated with the apparatus, an embedded web server configured to receive a request for the device driver, the request having been sent to a network address associated with the apparatus, and a modifying unit configured to modify the device driver to include the network address of the apparatus.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Figure 2:
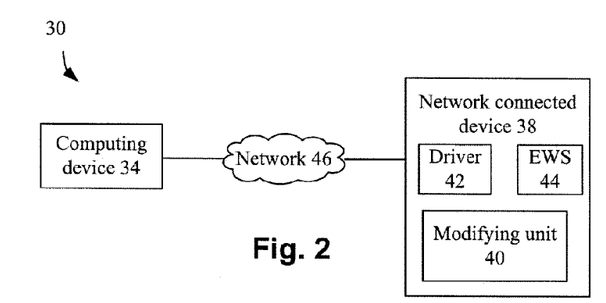
FIG. 2 illustrates an exemplary system that includes a computing device coupled to a network connected device through a network, in accordance with various embodiments of the present invention.

FIG. 2 illustrates an exemplary system 30 that includes a computing device 34 coupled to a network connected device 38 (referred to herein also as "device 38) through a network 46, in accordance with various embodiments of the present invention. The computing device 34 may be, for example, a desktop computer, a laptop, a server, and the like, and may operate with an appropriate type of operating system, e.g., Microsoft Windows®, MAC®, Linux®, etc. The network 46 may be any appropriate type of communication network, including but not limited to the Internet, an intranet, a home network, a corporate network, a local area network (LAN), a wide area network (WAN), any appropriate type of wired or wireless network, etc. The device 38 may be, for example, a printer (e.g., a color printer, a monochrome printer, a laser printer, a multifunction printer that includes additional capabilities like scanning, faxing, copying, etc.), a fax machine, a copier, a scanner, a webcam, a camera, a television, or any other appropriate appliance or peripheral connected to the network 46. In one embodiment, the device 38 communicates with the computing device 34 over the network 46 and provides one or more services to the computing device 34 over the network 46. The device 38 includes an embedded web server (EWS) 44 connected to the network 46.

The device 38 also includes a device driver 42 that is appropriate for the device 38. A device driver (or software driver) is a computer program that permits higher-level computer programs to interact with a hardware device. A device driver generally acts as an abstraction layer between a hardware device and the applications or operating systems that use the hardware device. Each version of a device, such as a printer, typically requires its own hardware-specific specialized commands. In contrast, most applications utilize devices by means of high-level device-generic commands such as PRINTLN (print a line). The device driver accepts these generic high-level commands and breaks the high-level commands into a series of low-level device-specific commands as required by the device being driven. Accordingly, if the device 38 is a printer, the device driver 42 may be a print driver appropriate for the printer. In various embodiments, although not illustrated in FIG. 2, the device 38 may include a storage unit (e.g., a read only memory (ROM), a flash memory, or any other appropriate type of memory), and the device driver 42 may be stored in the storage unit.

In various embodiments, a manufacturer may upload the device driver 42 in the device 38 during manufacturing. In various other embodiments, the device 38 may download and/or update the device driver 42, for example, from the manufacturer's website (or from a server, e.g., a print server) over the network 46 (or over a different network not illustrated in FIG. 2). Other ways of including the device driver 42 in the device 38 may also be envisioned by those skilled in the art (e.g., a system administrator or a user may upload and/or update the device driver 42, from an external storage device, to the device 38).

As shown in FIG. 1, the device 38 also includes a modifying unit 40 configured to modify the device driver 42. In various embodiments, the modifying unit 40 modifies the device driver 42 to include a network configuration (e.g., a network address, including an Internet protocol (IP) address, a host name, etc.) of the device 38, as discussed in more detail below.

The network connected device 38 may also include several components (not illustrated in FIG. 2). For example, in various embodiments, the device 38 may include a network interface to connect the device 38 to the network 46. In other examples, if the device 38 is a printer, then the device 38 would also include appropriate components required for printing, as is well known to those skilled in the art.

In order for the computing device 34 to utilize the functionalities of the device 38, appropriate driver software of the device 38 may be needed to be loaded, installed, and configured in the computing device 34, as is well known in the art. Accordingly, in various embodiments, the computing device 34 receives the device driver 42 from the device 38 over network 46 for installation within the computing device 34. Subsequent to installation of the device driver 42, the computing device 34 may effectively communicate with the device 38 and/or avail one or more services offered by the device 38 (e.g., print a page if device 38 is a printer, download photos or videos if device 38 is a camera or a webcam, change a television channel if device 38 is a television, configure the device 38 from the computing device 34, etc.).

In order to access the device driver 42, in various embodiments, the computing device 34 transmits a request for the device driver 42 to the device 38. To do so, the computing device 34 or a user of the computing device 34 may first need to be aware of a network configuration (e.g., a network address including an IP address and/or a host name) of the device 38. For example, in various embodiments, if the device 38 is a printer, a user of the computing device 34 may print a configuration page on the printer 38 directly from the printer control panel, and the printed configuration page may include the network configuration of the device 38. Alternatively, a network administrator may set up the device 38 in the network 46 and pass the network configuration of the device 38 to a user of the computing device 34. In other embodiments, a user may be aware of the configuration of the device 38 by accessing a network router to which the computing device 34 and/or device 38 are connected. A person skilled in the art may also envision other ways to be aware of the network configuration of the device 38.

In various embodiments, once a user of the computing device 34 is aware of the network configuration of the device 38, including a network address (e.g., an IP address and/or a host name) associated with the device 38, the user loads a web browser in the computing device 34 and enters the IP address (or the host name) in the web browser to gain access to a web page served by the embedded web server 44. In various embodiments, the web page includes options for downloading and/or installing the device driver 42 from the device 38 to the computing device 34. For example, in various embodiments, the webpage includes a "Download Driver" button, and selection of the button initiates a download of device driver 42 from the device 38 to the computing device 34 over the network 46.

In various embodiments, once the device driver 42 is downloaded in the computing device 34, the device driver 42 may not have knowledge of where it originated from. Put differently, after being downloaded in the computing device 34, the device driver 42 may be unaware of the network configuration of the device 38 from which the device driver 42 has been downloaded. However, one or more received information included in the network configuration (e.g., network address) may be required for installation and configuration of the device driver 42 in the computing device 34, to enable the computing device 34 to subsequently access the device 38 over network 46.

Accordingly, during an installation process of the device driver 42 in the computing device 34, a user of the computing device 34 may be prompted to input the network configuration, including the IP address and/or the host name of the device 38. This may be confusing for the user, as the user had already entered the IP address or the host name of the device 38 in the web browser at the beginning of the device driver download process. Thus, entering the information once again may result in increased user participation in the device driver installation process, increased probability of error (e.g., user mistakenly entering wrong information), increased user confusion and/or decreased user satisfaction. In various embodiments, it may be desired to transmit the network configuration information of the device 38, along with the device driver 42, to the computing device 34, as discussed in more detail herein later.

Figure 3:
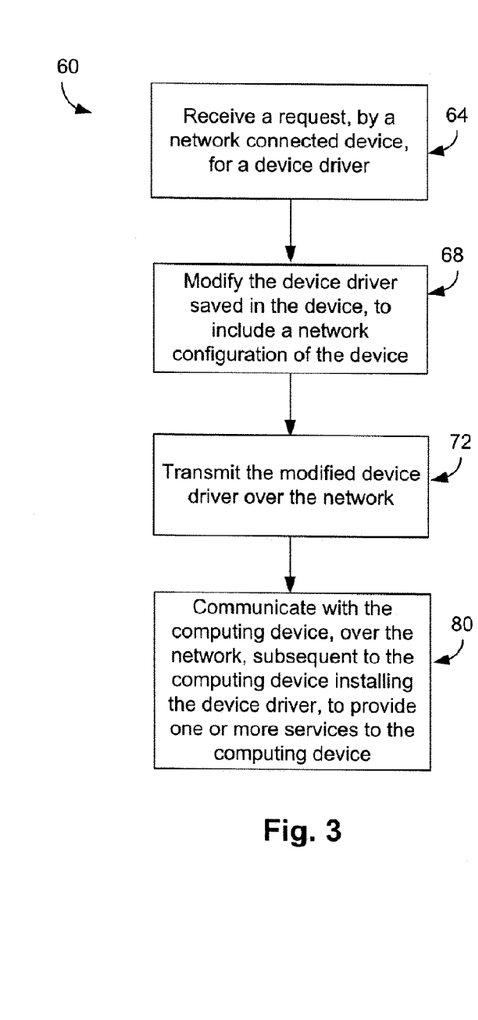
FIG. 3 illustrates an exemplary method for modifying and transmitting a device driver from the network connected device of FIG. 2, in accordance with various embodiments of the present invention.

FIG. 3 illustrates an exemplary method 60 for modifying and transmitting the device driver 42 from the network connected device 38 of FIG. 2, in accordance with various embodiments of the present invention. Method 60 includes, at 64, the network connected device 38 receiving a request from the computing device 34 for the device driver 42. For example, the computing device 34 and/or its user may load a web browser in the computing device 34 and enter the IP address (or the host name) of the device 38 in the web browser to gain access to a web page served by the embedded web server 44, and transmit the request through this web page, as previously discussed.

The method 60 further includes, at 68, modifying the device driver 42 to include a network configuration (e.g., network address, including the IP address and/or the host name) of the device 38. In various embodiments, the modification of the device driver 42 may be performed by the modifying unit 40. For example, in various embodiments, the device driver 42 includes a package comprising plurality of zipped files, and the modifying unit 40 modifies one or more existing file in the package to include the required network configuration of the device 38. In various other embodiments, the modifying unit 40 modifies a name of one or more files in the device driver software package to reflect the IP address, the host name, and/or other appropriate network configuration information (e.g., by appending the IP address and/or hostname in the name of one or more files). For example, if an exemplary IP address of the device 38 is 11.22.33.44 and if one of the files in the device driver package is originally named as Driversetup.exe, the modifying unit 40 may modify the file name as Driversetup_11_22_33_44.exe. In another example, the file name may be modified to include a host name as Driversetup_H[-hostname-].exe, with the H denoting that a host name is appended. Thus, if an exemplary host name is NP131X90, the new file name may be Driversetup_H [-NP131X90].exe. In various embodiments, it may be desired to include a host name in the modified device driver, as a host name may remain unchanged even if a dynamic host configuration protocol (DHCP) is used to connect the device 38 to the network 46. Any other desired network configuration may also be included in the device driver package.

In various embodiments, one or more other information may also be included in the device driver package. For example, if an exemplary IP address of the device 38 is 11.22.33.44 and if the device 38 supports Internet Protocol version 4 (IPv4), a file Driversetup.exe in the device driver package may then be modified as Driversetup_IP4 [11.22.33.44] or Driversetup_IP4[11.22.33.44].exe, wherein the modified name may indicate support for IPv4 protocol. Similarly, if the device 38 supports Internet Protocol version 6 (IPv6) and an IP address of the device 38 is fec0::1:216: 41ff:fee7:1d0%1 according to the IPv6 protocol, the file name Driversetup.exe may be modified to Driversetup_IP6 [fec0::1:216:41ff:fee7:1d0a %1] to reflect the IP address and the supported protocol of the device 38.

Referring again to FIG. 3, at 72, the device 38 transmits the modified device driver over the network 46 to the computing device 34. Thus, in various embodiments, the device 38 transmits the device driver 42, along with a network configuration of the device 38, over the network 46, to the computing device 34 that requested the device driver 42.

A person skilled in the art may envision numerous other ways to modify and/or transmit the device driver package and the desired network configuration information. For example, in various embodiments, instead of modifying an existing file of the device driver 42, the device 38 may add a new file that includes the desired network configuration information, in the device driver 42, and transmit the device driver 42, along with the new file, at 72.

In various other embodiments, the device 34 may not modify the device driver 42, thereby eliminating the need of block 68 in FIG. 3. Instead, for example, at 72, the device 38 may separately transmit the original device driver 42 and the desired network configuration of the device (possibly by including the desired information in a separate file) to the computing device. Other variations of the method 60 may also be envisioned by those skilled in the art.

Subsequent to downloading and proper installation of the device driver 42 in the computing device 34, at 80, the device 38 communicates with the computing device 34, over the network 46, to provide one or more services to the computing device 34.

Figure 4:
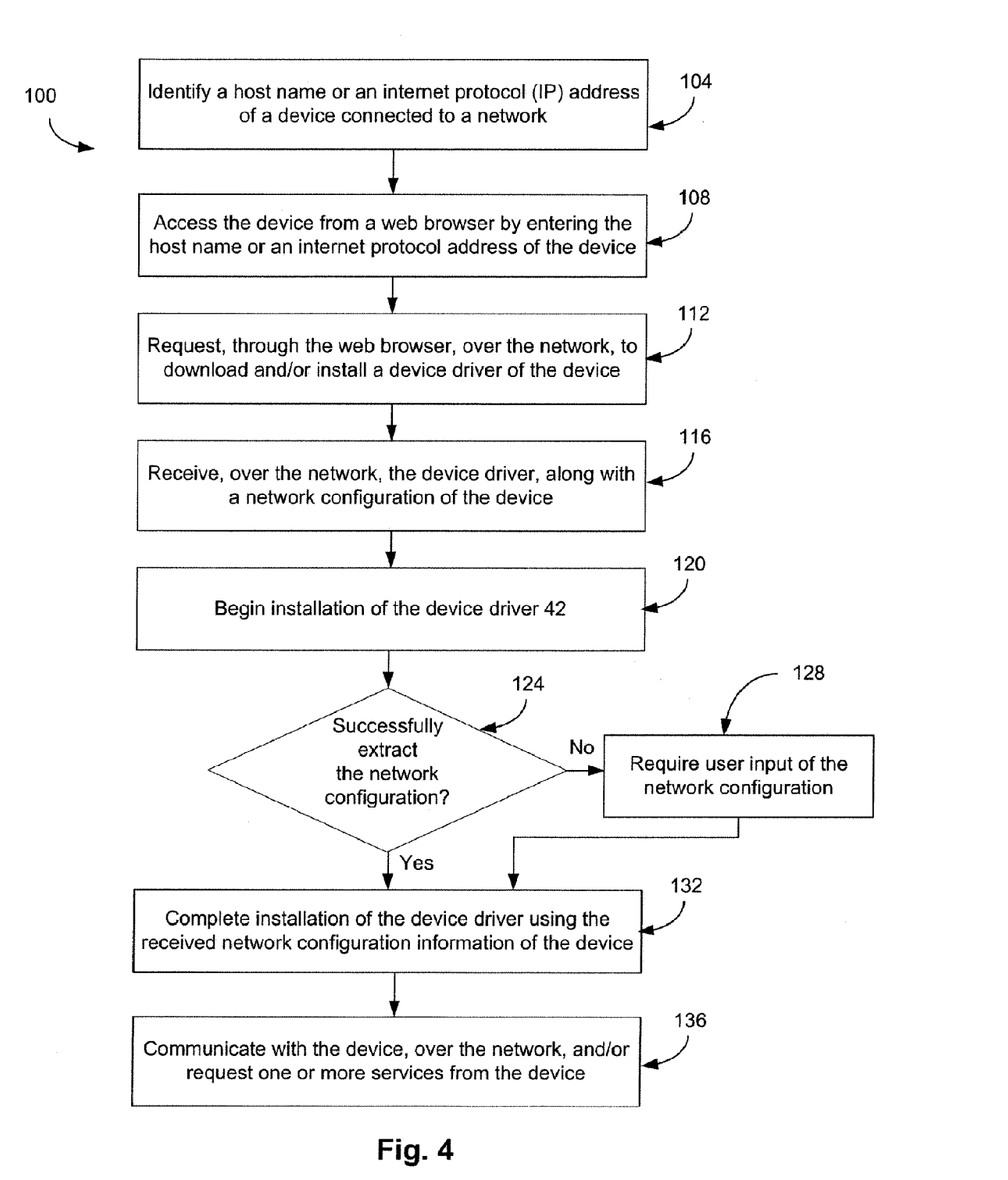
FIG. 4 illustrates an exemplary method for requesting, receiving, and installing a device driver, in accordance with various embodiments of the present invention.

FIG. 4 illustrates an exemplary method 100 for requesting, receiving, and installing the device driver 42 of FIG. 2, in accordance with various embodiments of the present invention. Referring to FIGS. 2 and 4, at 104, the computing device 34 identifies a host name or an IP address of the network connected device 38. In various embodiments, such identification may be performed utilizing one of the several ways previously discussed herein.

The method 100 further includes, at 108, accessing the device 38, over the network 46, from a web browser in the computing device 34, by entering a host name or an IP address of the device 38 in the browser, thereby gaining access to a webpage served by the embedded web server 44 included in the device 38. The webpage may include options to download and/or install the device driver 42 in the computing device 34. At 112, the computing device 34 or its user requests, through the accessed web page in the web browser, to download and/or install the device driver 42.

As previously discussed in more detail herein with respect to FIG. 3, upon receiving the request at 112, the device 38 may transmit, over the network 46, the requested device driver, along with a network configuration (e.g., network address including an IP address, a host name, etc.) of the device 38. At 116, the computing device 34 may receive, over the network 46, the requested device driver 42, along with the network configuration of the device 38.

In various embodiments, at 120, the installation of the device driver 42 begins in the computing device 34, e.g., through a device driver installer program (included in the device driver 42). As a part of the installation process, network configuration of the device 38, including the IP address and/or the host name of the device 38 may be necessary. Accordingly, at 124, the device driver installer program, running in the computing device 34, attempts to extract the same from the received device driver. In various embodiments, upon successful extraction of the network configuration information, the installation of the device driver 42 may continue and at 132, be completed using, among other information, the extracted network configuration information.

In various embodiments, it may not be possible to successfully extract the network configuration of the device 38 from the received modified device driver due to, for example, an error while including the network configuration in the device driver by the device 38. In various other embodiments, if an IP address and/or a host name is appended in a name of one or more files of the device driver 42, as previously discussed herein, an user of the computing device 38 may inadvertently change the file name after downloading the device driver 42 in the computing device 34 but before extracting the network configuration at 124 (or before starting the installation process at 120), resulting in failure at 124. Other possible error conditions may also result in failure at 124. Accordingly, at 128, a user of the computing device 34 may be enquired and be required to input the desired network configuration, subsequent to which the installation process may continue and be completed at 132.

Upon successful installation of the device driver 42, at 136, the computing device may communicate with the device 38, over network 46, and/or request one or more services from the device 38.

Figure 5:
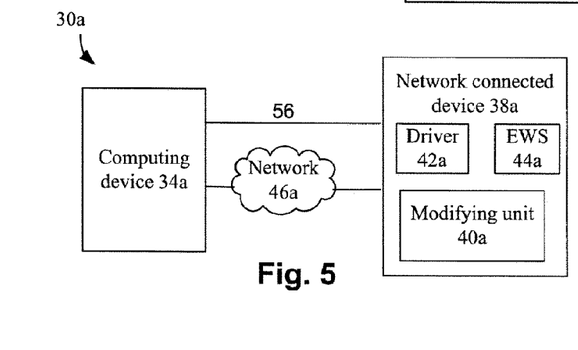
FIG. 5 illustrates an exemplary system that includes a computing device coupled to a network connected device through a network and a link, in accordance with various embodiments of the present invention.

FIG. 5 illustrates an exemplary system 30a that includes a computing device 34a coupled to a network connected device 38a through a network 46a and a link 56, in accordance with various embodiments of the present invention. In various embodiments, the system 30a of FIG. 5 may be substantially similar to the system 30 of FIG. 2. For example, one or more components of FIG. 5 (expect the additional link 56) may be substantially similar to its respective components of FIG. 3.

In various embodiments, the link 56 may be, for example, a universal serial bus (USB) link, a Bluetooth link, or other appropriate type of wired or wireless link. Thus, the device 38 may be coupled to the computing device 34 through two distinct connections: link 56 and network 46a. The network connected device 38a may also include several components (not illustrated in FIG. 5) that are well known to those skilled in the art, e.g., a network interface to connect the device 38a to the network 46a, a USB port (if the link 56 is a USB link) to connect the device 38a to the USB link 56, etc.

In various embodiments, unlike system 30 of FIG. 2, the computing device 34a of FIG. 5 may initially utilize the link 56 to load the device driver 42a in the computing device 34a. The device 38a may also transmit its network configuration information (e.g., a network address, including an IP address, a host name, etc. associated with network 46a) to the computing device 34a, over the link 56, along with (or separately) transmitting the device driver 42a to the computing device 34a.

Upon successful loading and installation of the device driver 42a in the computing device 34a, in various embodiments, the link 56 may optionally be decoupled or disconnected. Subsequently, the computing device 34a may communicate with the device 38a and/or avail one or services provided by the device 38a over the network 46a.

For example, the device 38a may be a printer and a user may desire to connect and use the printer over a home network (e.g., network 46a) from a computer (e.g., the computing device 34a). The user may connect the printer and the computing device 34a to the home network 46a. In various embodiments, the printer and the computing device 34a may also be physically proximally located. For proper communication between the printer and the computing device 34a, the user may need to install a print driver (e.g., device driver 42a) in the computing device 34a. Although it may be possible to load and install the print driver over the network 46a, this may require some additional efforts on the part of the user (e.g., identifying a host name, IP address, etc. of the printer, entering the same in a web browser to initiate the installation process, etc.). Instead of installing the print driver over the network 46a, the user may desire to use a USB cable (e.g., link 56) for device driver installation. Subsequent to coupling the printer and the computing device 34a using the USB cable 56, the printer may come up as a mass storage device in the computing device 34a, and in various embodiments, an auto run file stored in the printer may be executed by the computing device 34a, initiating the loading and/or installation of the printer driver. In various embodiments, the printer driver may also include a network configuration of the printer. In alternate embodiments, a device driver installer program may query the printer and receive, via the USB link 56, the IP address, host name and/or any other network configuration of the printer. Thus, the print driver may be loaded from the printer to the computing device 34a over the USB connection 56, along with various network configurations of the printer. After the printer driver has been successfully installed, the user may disconnect the USB cable 56 and use the printer from the computing device 34a, over the home network 46a.

Figure 6:
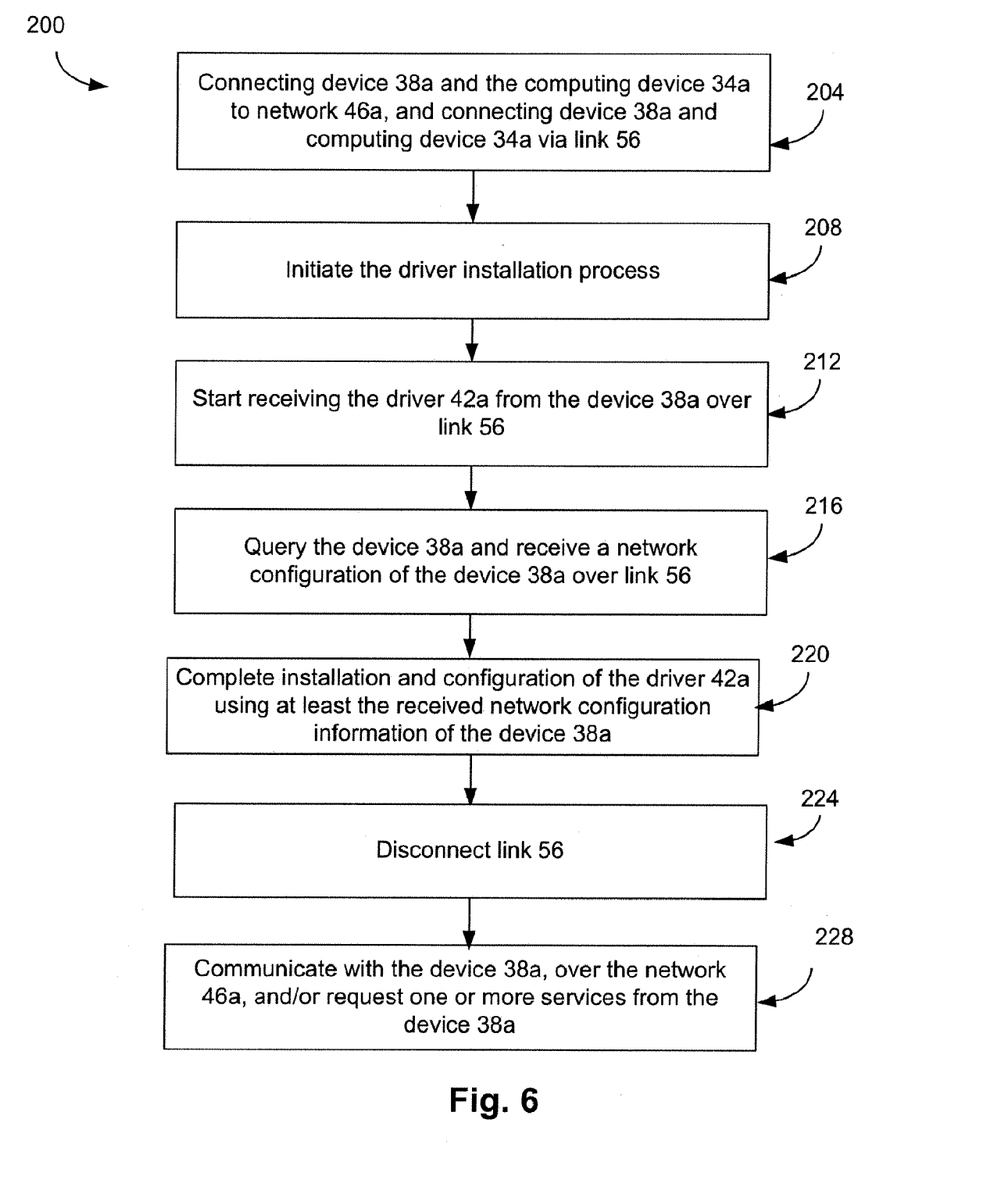
FIG. 6 illustrates an exemplary method for installing a device driver of the network connected device of FIG. 5 on the computing device over the link, in accordance with various embodiments of the present invention.

FIG. 6 illustrates an exemplary method 200 for installing the device driver 42a of the device 38a on the computing device 34a over link 56 of FIG. 5, in accordance with various embodiments of the present invention. Referring to FIGS. 5 and 6, the method 200 includes, at 204, connecting the computing device 34a and device 38a to the network 46a, and also coupling the computing device 34a and device 38a using link 56. Once the computing device 34a and device 38a are coupled through link 56, in various embodiments, the device 38a initially appears as a mass storage device on the computing device 34a. In various embodiments, an auto run file loads from the device 38a into the computing device 34a and executes, resulting in an initiation of the device driver installation process at 208. In various other embodiments, the device driver installation process may also be manually initiated by a user of the computing device 34a. During the initiation of the device driver installation process, a user may optionally select a network installation option so that the installation process may be aware of the user's desire to use the device 38a over the network 46a, instead of and/or in addition to using the device 38a over the link 56.

At 212, the computing device 34a (or an installer program running on the computing device) starts receiving the device driver 42a. In various embodiments, at 216, the installer program running in the computing device 34a may query the device 38a and receive the desired network configuration of the device 38a over link 56. In various embodiments, the device 38a may transmit the network configuration, along the device driver 42a, to the computing device 34a over link 56. In yet other embodiments, the device 38a (or the modifying unit 40a) may modify the device driver 42a, as discussed with respect to FIG. 3, and transmit the modified device driver 42a to the computing device 34a over link 56. For some of these embodiments, operations 212 and 216 of method 200 may need to be appropriately modified, as will be readily understood by those skilled in the art based on the disclosure and teachings provided herein. For example, in various embodiments, if the computing device 34a receives the network configuration along with the device driver 42a at 212, there may not be any need for separately querying the device 38a at 216.

In various embodiments, at 220, the installation and configuration of the device driver 42a may be complete using at least the received network configuration information of the device 38a. In various embodiments, at 224, the link 56 may be optionally disconnected, although in other embodiments, the link may 56 may remain coupled to the computing device 34a and/or the device 38a. At 228, the computing device 38a communicates with the device 38a, over the network 46a, and/or requests one or more services from the device 38a over network 46a.

Figure 7:
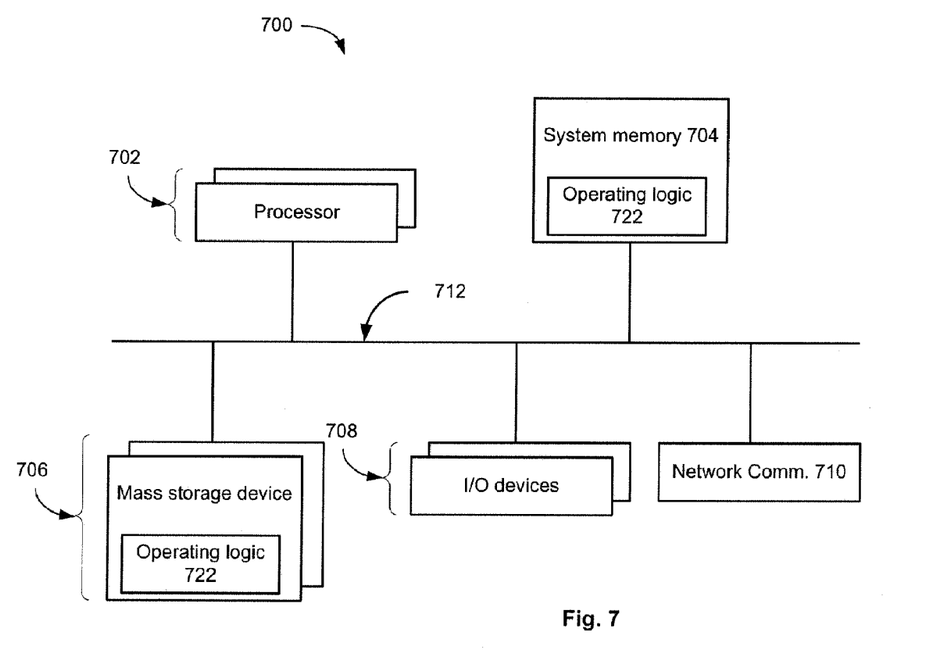
FIG. 7 is a block diagram of an exemplary system suitable for use to practice the present invention.

FIG. 7 is a block diagram of an exemplary system 700 suitable for use to practice the present invention, in accordance with various embodiments of the present invention. As illustrated, system 700 includes one or more processors or processor cores 702, and system memory 704. For the purpose of this application, including the claims, the terms "processor" and "processor cores" may be considered synonymous, unless the context clearly requires otherwise. Additionally, system 700 includes mass storage devices 706 (such as diskette, hard drive, compact disc read only memory (CDROM) and so forth), input/output devices 708 and communication interfaces 710 (such as network interface cards, modems and so forth). The elements of FIG. 7 are coupled to each other via system bus 712, which may represent one or more buses. In the case of multiple buses, they may be bridged by one or more bus bridges (not illustrated).

Each of these elements performs its conventional functions known in the art. In particular, system memory 704 and mass storage 706 may be employed to store a working copy and a permanent copy of the programming instructions implementing all or a portion of earlier described functions, herein collectively denoted as 722. The instructions 722 may be assembler instructions supported by processor(s) 702 or instructions that can be compiled from high level languages, such as C.

The permanent copy of the programming instructions may be placed into permanent storage 706 in the factory, or in the field, through, for example, a distribution medium (not shown), such as a compact disc (CD), or through communication interface 710 (from a distribution server (not shown)). That is, one or more distribution media having instructions 722 may be employed to distribute the instructions 722 and program various computing devices. The constitution of these elements 702-712 are generally well known, and accordingly will not be further described.

In various embodiments, the system 700 may be configured to operate as the computing device 34 and/or 34a of FIGS. 2 and 5, respectively, and further configured to be connected to a network, e.g. network 46 and/or 46a of FIGS. 2 and 5, respectively. The system 700 may also be configured to be coupled to a link, e.g. link 56 FIG. 5. The system 700 may further be configured to load a web browser, using which the system 700 may access a network connected device (e.g., device 38 and/or 38a of FIGS. 2 and 5, respectively), over the network, as previously discussed herein. The system 700 may also be configured to download a device driver (e.g., device driver 42 or 42a) from the device, install the device driver, and subsequently communicate with and/or avail one or more service provided by the device over the network, as has been previously discussed herein. One or more instructions (e.g., instructions 722) stored in the system memory 704 and/or storage device 706 may facilitate said communication with said device, said availing of services form said device, and/or loading, installation and configuration of said device driver in the system 700.

In various embodiments, the system 700 may also be configured to operate as the network connected device 34 or 34a of FIGS. 2 and 5, respectively, and may include several other components, such as the embedded web server 44 and/or 44a, modifying unit 40 and/or 40a of FIGS. 2 and 5, a printing mechanism (e.g., if the device 38 or 38a is a printer), etc. The system may be configured to be coupled to a network, e.g. network 46 and/or 46a, respectively, and provide one or more services to a computing device (e.g., computing device 34 and/or 34a) over the network. The system 700 may also be configured to be coupled to a link, e.g. link 56 FIG. 5, and also configured to store a device driver (e.g., device driver 42 or 42a) in the system memory 704 and/or mass storage device 706. The system 700 may also be configured to modify said device driver and transmit the same to the computing device over the network 46 or 46a or over the link 56, as has been previously discussed herein. One or more instructions (e.g., instructions 722) stored in the system memory 704 and/or storage device 706 may facilitate said communication with said computing device, said providing services to said computing device, modifying and/or transmitting said device driver, etc.

Although specific embodiments have been illustrated and described herein, it will be appreciated by those of ordinary skill in the art and others, that a wide variety of alternate and/or equivalent implementations may be substituted for the specific embodiment illustrated and described without departing from the scope of the present invention. This present invention covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiment discussed herein. Therefore, it is manifested and intended that the invention be limited only by the claims and the equivalents thereof.

What is claimed is:

1. A method comprising:
receiving, at a device, a request from a computing device for a device driver associated with the device, wherein the request for the device driver is received at the device via a network, and wherein the device has a network configuration in the network;
responsive to receiving the request, modifying the device driver to include the network configuration of the device;
transmitting, from the device to the computing device, the device driver as modified to include the network configuration of the device; and
modifying the device driver comprises modifying the file of the device driver to include the network configuration information of the device,
wherein the device driver comprises a file, and
wherein modifying the file of the device driver comprises appending an Internet Protocol (IP) address or a host name of the network to a name of the file.

2. The method of claim 1, wherein modifying the file of the device driver comprises modifying content of the file of the device driver.

3. The method of claim 1, wherein:
the request for the device driver is received from the computing device over a Universal Serial Bus (USB) connection; and
the device driver, as modified to include the network configuration of the device, is transmitted by the device to the computing device over the USB connection.

4. The method of claim 1, wherein the device comprises one or more of a printer, a fax machine, a copier, a webcam, a television, or a camera.

5. The method of claim 1, wherein the network configuration includes an Internet Protocol (IP) address or a host name of the network.

6. A method comprising:
receiving, at a device, a request from a computing device for a device driver associated with the device, wherein the device driver comprises a file, wherein the request for the device driver is received at the device via a network, and wherein the device has a network configuration in the network;
responsive to receiving the request, modifying, by a modifying unit of the device, the file of the device driver to include the network configuration of the device;
transmitting, from the device to the computing device, the device driver as modified to include the network configuration of the device; and
modifying the file of the device driver comprises appending an Internet Protocol (IP) address or a host name of the network to a name of the file.

7. The method of claim 6, wherein modifying the file of the device driver comprises modifying content of the file of the device driver.

8. The method of claim 6, wherein:
the request for the device driver is received from the computing device over a Universal Serial Bus (USB) connection; and
the device driver, as modified to include the network configuration of the device, is transmitted by the device to the computing device over the USB connection.

9. The method of claim 6, wherein the device comprises one or more of a printer, a fax machine, a copier, a webcam, a television, or a camera.

10. The method of claim 6, wherein the network configuration includes an Internet Protocol (IP) address or a host name of the network.

\* \* \* \* \*